United States Patent [19]
Ward

[11] 3,863,667
[45] Feb. 4, 1975

[54] COMBINED SHEAR HEAD AND HOUSING PLUG

[75] Inventor: Gene T. Ward, Highland Heights, Ohio

[73] Assignee: The Pipe Line Development Company, Cleveland, Ohio

[22] Filed: Mar. 21, 1973

[21] Appl. No.: 343,505

[52] U.S. Cl. ............... 137/318, 138/94.3, 166/55, 29/157;213
[51] Int. Cl. ...................... B23b 41/08, F16e 41/04
[58] Field of Search ............ 137/15, 315, 317, 318; 138/90–94, 94.3, 94.5, 95, 96; 251/214; 166/.5, 55

[56] References Cited
UNITED STATES PATENTS

| | | | |
|---|---|---|---|
| 3,170,226 | 2/1965 | Larry | 29/213 X |
| 3,590,920 | 7/1971 | Orund et al. | 166/55 |
| 3,687,166 | 8/1972 | Herrin | 138/94 |
| 3,766,978 | 10/1973 | Orund et al. | 166/.5 |

*Primary Examiner*—Martin P. Schwadron
*Assistant Examiner*—David R. Matthews
*Attorney, Agent, or Firm*—McNenny, Farrington, Pearne & Gordon

[57] ABSTRACT

Flow control apparatus for installation on a live pipeline including a fluid tight housing secured to the exterior of the pipeline and a cutter in the housing operable by an external actuator to sever a wall of the pipeline. An aperture in the housing through which the actuator operates is sealable by the cutter when the cutter is retracted from the pipeline to permit the actuator and related components to be separated from the housing without loss of fluid from the severed pipeline.

13 Claims, 5 Drawing Figures

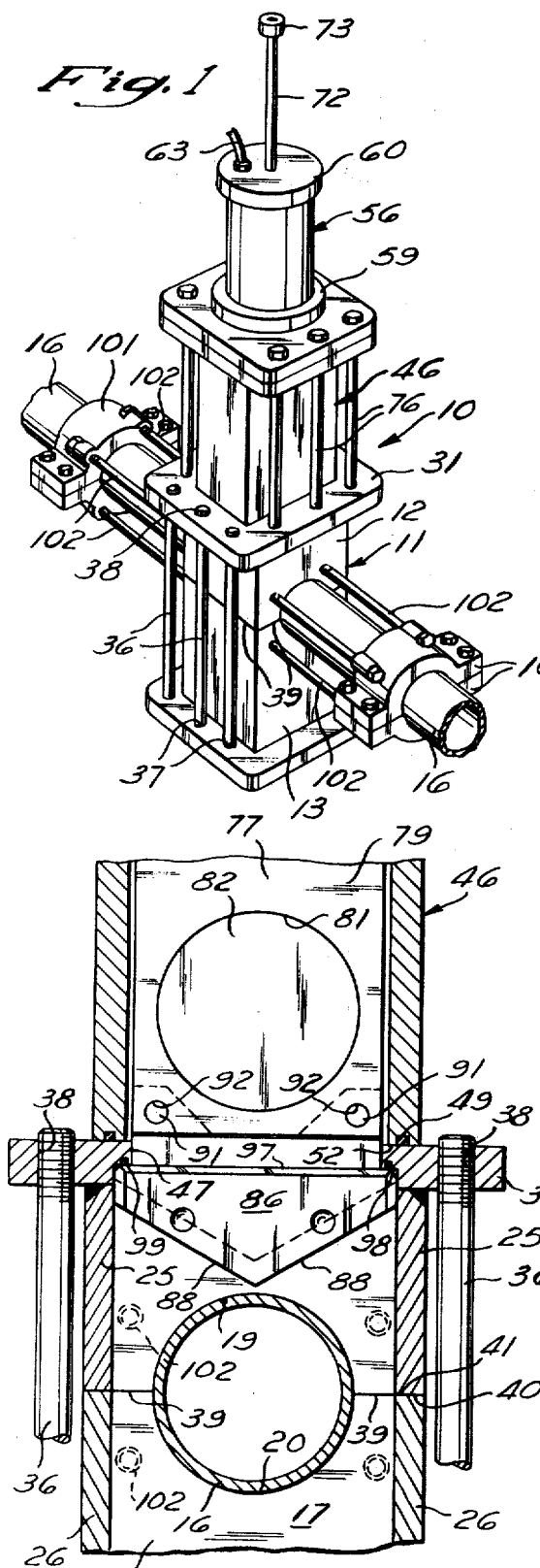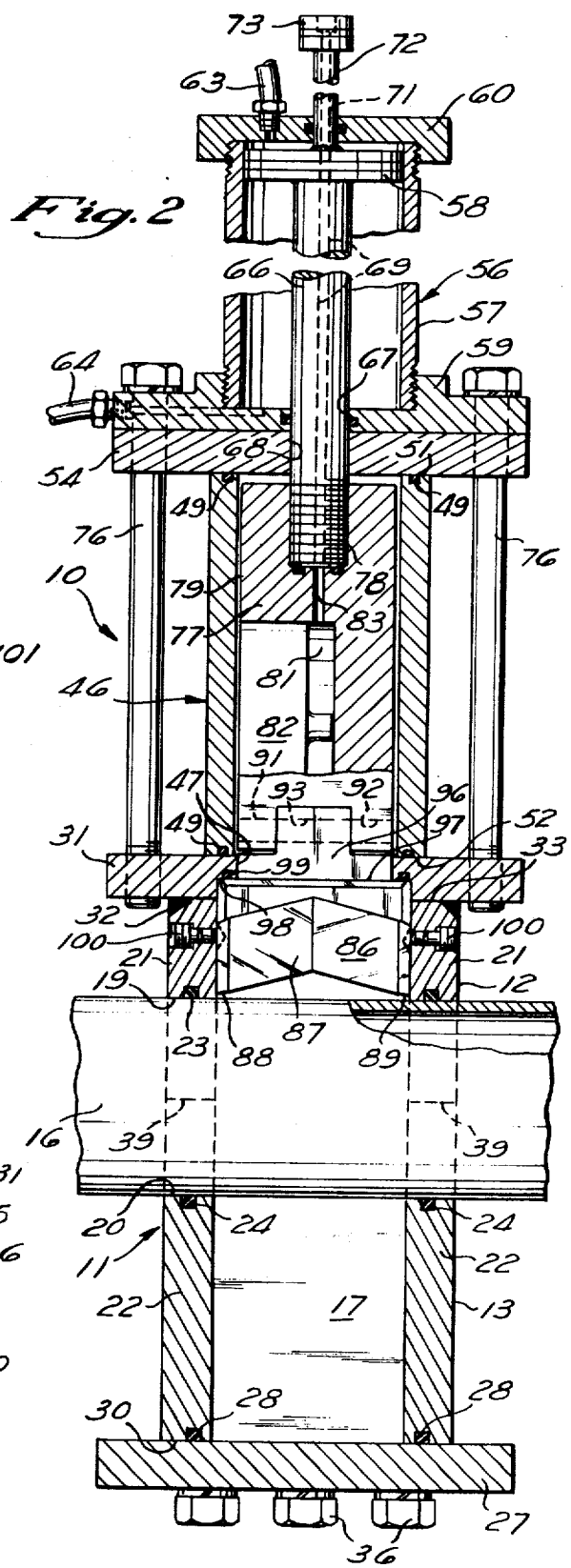

COMBINED SHEAR HEAD AND HOUSING PLUG

BACKGROUND OF THE INVENTION

The invention relates to improvements in apparatus for controlling fluid flow in service pipelines or the like. More specifically, the invention relates to apparatus for cutting into a section of a pipe wall after the pipeline has been put into service to thereby modify the flow path in the line.

PRIOR ART

The invention provides improvements in the type of apparatus disclosed in U.S. Patent applications Ser. Nos. 196,368 now U.S. Pat. No. 3,785,041 and 196,456, now U.S. Pat. No. 3,833,020 both filed Nov. 8, 1971, which are division and continuation applications respectively of U.S. patent application Ser. No. 13,295 filed Feb. 24, 1970, now abandoned, each assigned to assignee of the present invention.

Such apparatus generally includes a fluid tight housing secured to the exterior of a pipe at a desired control location. A cutter within the housing, preferably in the form of a double edged shear, is movable radially through the pipe wall by an actuator operable through an aperture from the exterior of the housing. Ideally, a pipe plugging device associated with the cutter is operable after the cutter has passed diametrally through the pipe. The plugging device is movable relative to the cutter along the axis of the pipe against a severed pipe face to close off at least one section of the pipe. When plugging is no longer desirable, the cutter and plug may be retracted from the pipe into an associated chamber of the housing.

In many instances it is desirable to interrupt flow only for a limited period such as the time required to make a line repair or circuit alteration. After this period of use it is often practical to remove the actuator, at least, from the housing and pipeline for purposes of economy and reuse elsewhere. Certain apparatus of the type described have the disadvantage of requiring a number of operations and otherwise unnecessary equipment for removal of the actuator. The housing must be sealed to prevent escape of fluid before the actuator and related equipment are removed. As disclosed in the above mentioned patent applications, for example, it has been contemplated to seal the housing with a gate valve which may be closed after control operations are conducted through it. Besides investment in the gate valve itself, this arrangement requires additional actuator stroke length to permit a cutter to be withdrawn clear of the gate valve. Without the gate valve it has generally been necessary to leave the actuator and plugging device permanently assembled on the housing.

SUMMARY OF THE INVENTION

The invention provides an improved device for controlling flow in a service pipeline or the like which includes a cutter and an associated closure adapted to seal a housing in which the cutter operates after flow control operations have been completed. The cutter and closure are driven radially towards and away from the pipe by an external actuator operating through an aperture in the housing. Following flow control operations, the actuator is retracted to draw the closure into sealing engagement with the housing aperture to seal off the housing. The actuator and related components may then be separated from the housing for subsequent use elsewhere without escape of fluid from the severed portion of the pipe.

The use of a permanently installed external gate valve or similar housing close off device as disclosed in the prior art is no longer necessary to permit disassembly and subsequent separate use of the actuator and other components. The invention thus offers significant savings in the overall cost of after installed flow control devices. Further, since fewer parts are required with the present invention, the apparatus may be installed, operated and disassembled with less labor and less time than that required by prior devices.

In its preferred form, the flow control device includes a housing adapted to be secured to the exterior of a pipe and in which is received an integral pipe cutter and housing closure. The cutter is provided in the form of a shear adapted to cut into the pipe wall along a plane perpendicular to the pipe axis. A radial shearing force is developed by a piston and cylinder actuator external of the cutter housing. A block carrying a pipe plug is mounted in a pressure chamber between the cutter and the actuator. The pressure chamber communicates with the cutter housing through an aperture in the housing. In operation, the piston and cylinder actuator is extended to sever the pipe and register the pipe plug with a sheared end face of the pipe. When it is desired to terminate flow restriction or other flow control, the actuator is retracted to a position where the closure portion of the cutter is in sealing engagement with the housing aperture. The pipe plug carrying block and actuator along with the associated pressure chamber may then be removed from the housing.

BRIEF DESCRIPTION OF THE DRAWINGS

FIG. 1 is a perspective view of a flow control apparatus in accordance with the invention assembled on a section of pipeline.

FIG. 2 is an elevational view of the apparatus in cross section taken parallel to the axis of the pipe.

FIG. 3 is a fragmentary sectional view of a portion of the apparatus taken transverse to the axis of the pipe and illustrating certain elements in an initial position.

DESCRIPTION OF THE PREFERRED EMBODIMENT

Figure 4:
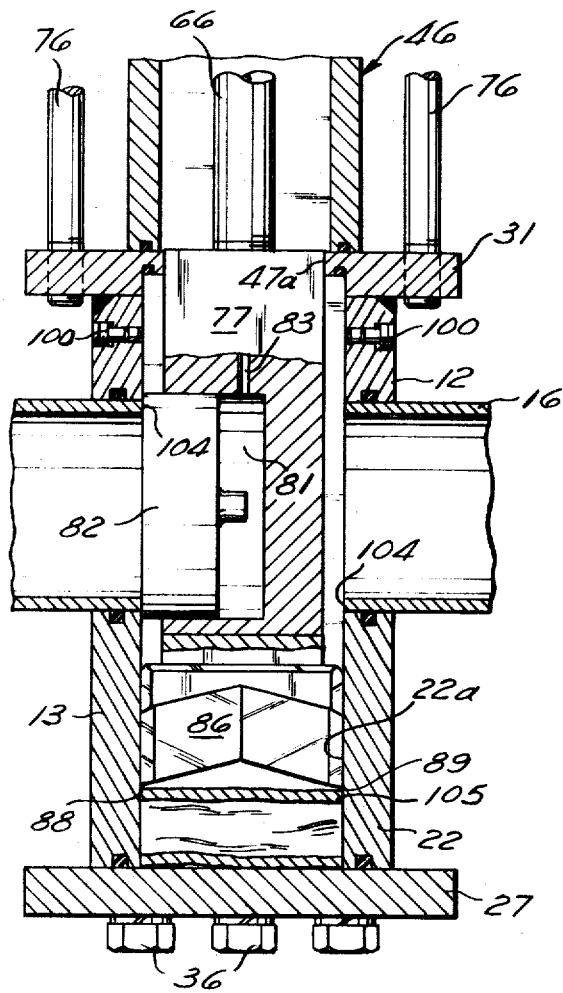
FIG. 4 is a fragmentary sectional view of a portion of the apparatus taken parallel to the axis of the pipe showing certain elements in a pipe plugging position.

Referring now to the Figures, there is illustrated a flow control apparatus 10 which may be used, for example, to block fluid flow in a pipeline 16 or the like to permit repairs or alterations to be made to the line. The apparatus 10 includes a housing 11 provided as separate upper and lower saddle portions 12 and 13 respectively. The saddle portions 12 and 13 are rectangular in cross section transverse to a line radial to the pipe 16 or conduit and complement each other to form an internal cavity or space 17 of likewise rectangular cross section. Walls 21 and 22 of the housing portions 12 and 13 extend in planes transverse to the pipe axis and are provided with semi-circular slots or recesses 19 and 20 respectively for reception therein of portions of the pipe section 16. Housing walls 25 and 26 of the upper and lower housing portions 12 and 13 are also planar and extend parallel to the axis of the pipe 16.

Arcuate grooves in the recesses 19 and 20 carry seals 23 of rubber or other known sealing material for circumferentially sealing the pipe or conduit 16 at the axially spaced locations of the side walls 21 and 22. The lower housing portion 13 is closed by an end plate 27 which cooperates with suitable seals 28 on a rectangular end face 30 of the housing portion. At its top, the upper housing portion 12 includes an end plate or wall 31 which may be welded as at 32 or otherwise sealingly secured to a rectangular end face or periphery 33 of the upper portion.

Elongated connecting bolts 36 extend through clearance holes 37 in the lower end plate 27 to aligned threaded holes 38 in the upper end plate 31 (FIG. 1) to hold the lower end plate in sealing engagement with the rectangular end face 30 of the housing portion 13. The connecting bolts 36 simultaneously secure the housing portions 12 and 13 together with the seals 23 and 24 in tight sealing engagement with the exterior of the pipe 16. Preferably, the semi-circular slots 19 and 20 are dimensioned with respect to the outside diameter of the pipe 16 to permit opposed end faces 40 and 41 of the portions 12 and 13 to abut along a continuous line 39 in a plane diametral to the pipe 16. Recessed seals (not shown) similar to the arcuate seals 23 and 24 are provided on one or both of the housing portions 12 and 13 at this separation line 39 to make the housing 11 fluid tight around the pipe 16.

As viewed in the Figures, a pressure chamber 46 is arranged on the upper housing portion 12 and communicates with the interior space 17 of the housing 11 through a rectangular aperture or opening 47 in the end plate 31. The aperture 47 is smaller in cross section than the rectangular housing interior 17 so that the housing walls 21, 22, 25 and 26 are outside of a zone defined by a radial projection of the aperture. The pressure chamber 46 is a rectangular, tubular structure having internal cross-sectional dimensions equal to or slightly larger than corresponding dimensions of the rectangular aperture 47. Recessed seals 49 are provided along the peripheries of upper and lower faces 51 and 52 respectively of the pressure chamber 46. The upper end face 51 of the pressure chamber 46 is sealed by an end plate 54.

Mounted on the chamber end plate 54 is a linear actuator 56 comprising a cylinder 57 and piston 58. The cylinder 57 is threaded into an end flange 59 at its lower end and is threaded into an end cap 60 at its upper end. The cylinder and piston actuator 66 is of the double acting type and is provided with a first port 63 for admitting fluid at the upper end cap 60 to advance or extend the piston 58 and is provided with a second port 64 at the end flange 59 for admitting fluid to retract the piston. A cylindrical piston rod 66 extends from the piston 58 through sealed bore 67 in the end flange 59 and an aligned hole 68 in the pressure chamber end plate 54.

The piston rod 66 is provided with an axial passage 69 along its full length. The piston rod passage 69 communicates with a similar passage 71 in an extension tube 72 welded or otherwise secured to the piston 58. The extension tube 72 is sufficiently long to permit the piston 58 to travel the length of the cylinder 57. A fitting 73 is provided on an outer end of the tube 72 for connecting a source of fluid (not shown) with the passages 71 and 69. A set of elongated connecting or tie bolts 76 retains the actuator 56 on the pressure chamber end plate 54 and the end plate on the end face 51 of the pressure chamber 46. A gasket (not shown) may be provided between the end flange 59 and plate 54 to prevent fluid leakage from the cylinder 57 or pressure chamber 46.

Associated with the actuator 56 is a rectangular block 77 disposed in the pressure chamber 46 and threaded onto an end 78 of the piston rod 66. The block 77 is dimensioned to slide radially relative to the pipe 16 through the rectangular opening 47 with a minimum of lateral and axial free play. A face 79 of the block 77 is formed with a blind cylindrical bore or recess 81. The bore 81 is in parallel axial alignment with the pipe 16. A piston or pipe plug 82 having a diameter at least equal to the inside diameter of the pipe 16 is slidably disposed in the bore 81. The piston bore 81 communicates with the piston rod passage 69 through a hole 83.

Figure 5:
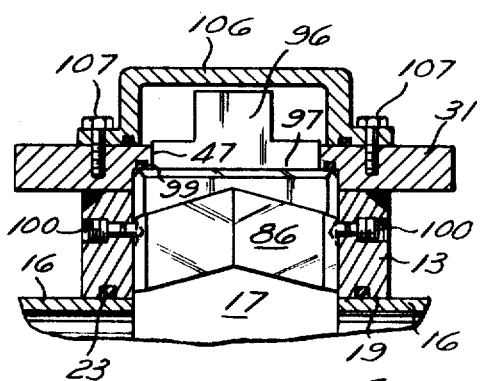
FIG. 5 is a fragmentary view of a combined cutter and housing closure of the apparatus in a retracted position.

A cutter or shear head 86 is slidably mounted in the upper housing portion 12. The shear head 86 includes a triangular or V-shaped body portion 87 (FIG. 2) having a pair of opposite cutting edges 88 and 89 each lying in a plane transverse to the axis of the pipe 16. The shear head 86 is releasably held on the plug carrying block 77 by a pair of spaced pins or bolts 91 positioned in aligned holes 92 and 93 in the block 77 and shear head 86 respectively. The shear head 86 includes an aperture closure portion 96 integral with the triangular portion 87. The closure portion 96 includes a rectangular shoulder 97 adapted to abut a cooperating seat or surface 98 in which the aperture 47 is formed. A resilient continuous recessed rectangular seal 99 is provided at the seat 98 to form a fluid tight seal with the shear head 86 when the latter is in its uppermost position as illustrated in FIGS. 2, 3 and 5. It is contemplated that other seal arrangements may be employed for sealing the aperture 47 such as providing a resilient seal on the shoulder 97. The shear head 86 is releasably retained in the sealing position by retaining bolts 100 threaded into the housing walls 21 against the shear portion 87.

The axial length and transverse width of the shear portion 87 are dimensioned to permit the shear head 86 to slide radially with respect to the pipe 16 in the upper and lower housing portions 12 and 13 with a minimum of axial and lateral free play. The shear head 86 is thus axially supported and guided by the interior surfaces of the transverse housing walls 21 and 22 and is laterally supported and guided by the interior surfaces of the axial housing walls 25 and 26.

A pair of clamp rings 101 are assembled on the exterior of the pipe 16 on opposed sides of the housing 11. The clamp rings 101 may, for example, be of the type disclosed in U.S. Pat. No. 3,252,192. When assembled on the pipe exterior the clamps 101 resist axial forces on the pipe. Each of the split clamp rings 101 are connected to the upper and lower housing portions 12 and 13 by axially extending tie rods 102 suitably threaded into blind holes in the housing portions 12 and 13.

The apparatus 10 is installed at a point on a live pipeline or conduit 16 in which it is desired, for example, to control fluid flow by opening or cutting into its wall to plug or restrict flow through it. The apparatus 10 is installed by positioning the upper and lower housing portions 12 and 13 around the pipe with the shear head 86 retained in the upper portion by the bolts 100. The upper and lower housing portions 12 and 13 are sealingly clamped to the pipe 16 by tightening the connecting bolts 36. With the housing portions 12 and 13 positioned on the pipe 16, the split clamp rings 101 are positioned on opposite sides of the housing 11 and the associated connecting rods 102 are drawn tight.

With the actuator piston 58 extended so that at least a portion of the block 77 extends out of the pressure chamber 46, the pins 91 are installed to connect the shear head 86 and block. The actuator piston 58 is then retracted so that the pressure chamber 46 is drawn against the housing end plate 31. The tie bolts 76 are then tightened to secure the actuator 56 and pressure chamber 46 to the housing 11.

Fluid pressure is introduced through the fitting 63 to extend the piston 58 and shear head 86. The shear head 86 severs the pipe 16 by exceeding its shear strength at parallel transverse planes defined by the cutting edges 88 and 89 and thereby develops fluid communication between the housing interior 17 and pressure chamber 46. Prior to assembly of the apparatus 10 on the pipe 16, the pipe wall may be partially severed at the planes of shear by a suitable tool, such as a conventional pipe cutter, through an arc of about 90° centered on the line of shear motion to facilitate the initiation of shearing action. With the retaining bolts 100 released, the shear 86 is driven by the actuator 56 completely through the pipe 16 from its initial position illustrated in FIGS. 2 and 3 to a final or fully extended position illustrated in FIG. 4. In the fully extended position, a completely severed section or coupon 105 (FIG. 4) of pipe is received in the lower housing chamber 13 and the plug-off piston 82 is in radial registration with the axis of the pipe 16. The plug-off piston 82 is then extended into sealing engagement with a severed end face 104 of the pipe 16 by admitting pressurized fluid to the cylindrical bore 81 from the source connected to the fitting 73 at the end of the extension rod 72. The clamp rings 101 prevent axial separation of the remaining portions of the pipe 16 which might otherwise result from forces developed by pressure in the pipe. The axial pressure reaction force on the block 77 developed by fluid pressure in the bore 81 is sustained by a radial surface 47a (FIG. 4) of the aperture 47 and by a corresponding surface 22a of the housing wall 22 abutting the shear 86.

After repairs or other operations have been effected in the pipeline 16 the piston plug 82 is allowed to retract within the plane of the block face 79 by venting the cylindrical bore 81 and allowing pressure in the pipeline to force the piston 82 into the cylindrical bore. Alternatively, springs (not shown) may be provided to bias the piston 82 into the bore 81. Thereafter, the shear 86 is retracted into the upper housing 12 where the seal 99 sealingly engages the shoulder 97 of the closure portion 96 to close and seal off the housing 11. The retaining bolts 100 are then advanced into the shear head 86 to insure that the shear head will remain in its sealed position.

The procedure outlined above for connecting the block 77, pressure chamber 46 and actuator 56 to the housing 11 may be reversed to remove these components from the housing for storage or for use elsewhere. It may thus be appreciated that with the apparatus 10 of the present invention it is not necessary to provide a gate valve or similar device to allow the actuator 56 and related components to be removed from the housing 11 without escape of fluid from the severed area of the pipe. Referring to FIG. 5, the closure portion 96 of the shear head 86 may be sealed from the environment of the pipe and the seal provided by the closure portion may be complemented by a cap or blind flange 106. The cap 106 is bolted to the housing end plate 31 by bolts 107.

It may be appreciated from the foregoing description that the apparatus 10 may be mounted on a pipeline without the use of power tools, when desired, and without welding. This is especially important where the apparatus is installed in hazardous or explosive environments. Although a preferred embodiment of this invention is illustrated, it is to be understood that various modifications and rearrangements of parts may be resorted to without departing from the scope of the invention disclosed and claimed herein. For example, the housing 11 and pressure chamber 46 may be provided with cylindrical configurations and with suitable guides for the shear head 86 where such construction is desired. Similarly, it is contemplated that various components such as the housing, may be assembled by welding its portions 12 and 13 together and may be secured to the pipe by welding.

What is claimed is:

1. Apparatus for altering a fluid flow path through a conduit in service comprising a fluid tight housing adapted to be secured to the exterior of the conduit, cutter means in said housing, actuator means external of said housing and movable into said housing through an aperture therein along a generally radial direction, said actuator means being releasably secured to said cutter means and adapted to move said cutter means from a position external of the conduit radially through a wall of the conduit whereby the conduit wall is severed and fluid communication between the interior of the conduit and the housing is developed, said actuator means being retractable from said housing along said radial direction and through said aperture, retraction of said actuator means causing said cutter means to withdraw from said conduit, and sealing means cooperating with said cutter means to seal said aperture to prevent loss of fluid from said housing, said actuator means being releasable from said cutter means when the latter is in sealing cooperation with said sealing means.

2. Apparatus as set forth in claim 1 wherein said cutter means is larger in cross section than said aperture in a plane perpendicular to said radial direction.

3. Apparatus as set forth in claim 1 wherein said cutter means comprises a shear head, and said actuator means is adapted to force said shear head through said means by exceeding the shear strength of the conduit wall along a plane substantially perpendicular to the longitudinal axis thereof.

4. Apparatus as set forth in claim 3 wherein said shear head includes a pair of cutting edges each lying in separate parallel planes.

5. Apparatus as set forth in claim 4 wherein said actuator means is adapted to move said shear head from a first portion of said housing through the wall of the conduit and into a second portion of said housing diametrically opposite said first portion.

6. Apparatus as set forth in claim 5 wherein said actuator means includes a carrier block to which said shear head is releasably secured, an axially movable plug in the carrier block adapted to seal a conduit end face formed by a cutting edge on said shear head when said shear head is moved into said second portion.

7. In a device for altering the fluid flow path through a pipe in service, a fluid tight housing having first and second portions adapted to be sealingly secured to the exterior of a pipe on opposite sides of its longitudinal axis, a pipe shear and plugging assembly including shear means and pipe plugging means, an actuator for forcing said shear means radially through a pipe wall section enclosed in said housing from said first housing portion into said second housing portion, said shear means including a cutting edge in a plane substantially transverse to the pipe axis and adapted to form a pipe end face when said shear means passes through said pipe, said plugging means being radially movable with said shear means, said plugging means including a pipe plug movable along the axis of the pipe to seal said pipe end face, the improvement which comprises a pressure chamber, a wall separating the pressure chamber and first housing portion, an aperture in said separating wall providing communication between said pressure chamber and said first housing chamber, said wall extending in a plane generally perpendicular to said radial direction, said shear means having dimensions in a plane parallel to said wall larger than corresponding dimensions of said aperture whereby said shear means is adapted to seal said aperture when in engagement therewith, said shear means and plugging means being separable from one another, and means for releasably holding said shear means and plugging means together, said holding means being outside of said first housing portion when said shear means seals said aperture.

8. The improvement as set forth in claim 7 wherein said wall is associated with said first housing portion, and including means for releasably securing said pressure chamber to said first housing portion whereby said pressure chamber is removable from said first housing portion after said shear means seals said aperture.

9. Apparatus for controlling fluid flow in a conduit in service comprising a fluid tight housing adapted to be sealingly secured on the exterior of a section of conduit, cutter means in the housing, an actuator external of the housing for extending the cutter means radially into a wall of the conduit and retracting the cutter means from the conduit, said actuator being operable through an aperture in the housing, guide surfaces in the housing for guiding the cutter means along a direction substantially radial to the conduit, said guide surfaces being solely outside of a zone defined by a radial projection of said aperture, said cutter means having aperture sealing surfaces outward of and peripherally continuous around said zone whereby said cutter means is adapted to seal said aperture when it is retracted from said conduit to a position where said sealing surfaces engage a portion of said housing surrounding said aperture, and means to separate said actuator from said cutter means when said sealing surfaces of said cutter means are in sealing engagement with said housing portion surrounding said aperture.

10. Apparatus as set forth in claim 9 wherein said actuator includes an element dimensioned with respect to said aperture to permit said element and said cutter said means to be guided radially and supported in an axial direction with respect to the conduit by said aperture.

11. Apparatus as set forth in claim 10 wherein said cutter means is adapted to pass diametrally through said conduit to form an end face on the conduit, said element comprising a block member, and plug means carried by said block member and movable with respect to said block member to sealingly engage said conduit end face.

12. Apparatus as set forth in claim 11 wherein said separating means includes means for releasably connecting said block member to said cutter means whereby said block member may be removed from said cutter means when said sealing surface of said cutter means is in sealing engagement with said housing portion.

13. Apparatus for controlling fluid flow in a live pipeline comprising a housing sealingly secured around the exterior of a section of the pipeline, said housing having an interior of rectangular cross section along a direction radial to the axis of the pipeline, said housing including first and second portions on opposite sides of the pipeline, a shear receivable in the first housing portion, a linear actuator external of said housing adapted to radially extend the shear from the first housing portion to the second housing portion by exceeding the shear strength of the pipeline wall, an aperture in said first housing portion having a rectangular cross section along the radial line of movement of said actuator, a block associated with said actuator and having cross-sectional dimensions substantially equal to the dimensions of the aperture such that the block is slidable through the aperture and is axially and laterally supported by it, a cylindrical bore in said block in parallel alignment with the axis of the pipe, a cylindrical pipe plug in said bore, said plug being in radial alignment with said pipe when said shear is in said second housing portion, means operable externally of the housing for selectively extending the plug axially relative to the block when the plug is in radial alignment with the pipeline whereby the plug is adapted to sealingly engage an end face of the pipeline formed by the shear, said shear being dimensioned to slidably engage the interior surfaces of the housing such that the shear is axially and laterally supported by said interior housing surfaces, said shear including aperture closure surface portions outside of a zone defined by a radial projection of said aperture, and peripheral seal means associated with said aperture, said closure surface portions adapted to engage said peripheral seal means of said aperture to prevent escape of fluid from said housing after said pipeline has been severed by said shear and said shear is retracted from said pipe.

* * * * *